(12) United States Patent  
Fouda et al.

(10) Patent No.: US 11,914,098 B2
(45) Date of Patent: Feb. 27, 2024

(54) MULTI-FREQUENCY BOREHOLE IMAGERS UTILIZING RESONATOR ANTENNAS

(71) Applicant: Halliburton Energy Services, Inc., Houston, TX (US)

(72) Inventors: Ahmed Fouda, Houston, TX (US); Baris Guner, Houston, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 65 days.

(21) Appl. No.: 17/736,845

(22) Filed: May 4, 2022

(65) Prior Publication Data

US 2023/0358914 A1    Nov. 9, 2023

(51) Int. Cl.
  *G01V 3/38* (2006.01)
  *E21B 47/002* (2012.01)
  *G01V 3/30* (2006.01)

(52) U.S. Cl.
  CPC .............. *G01V 3/38* (2013.01); *E21B 47/002* (2020.05); *G01V 3/30* (2013.01)

(58) Field of Classification Search
  None
  See application file for complete search history.

(56) References Cited

U.S. PATENT DOCUMENTS

| | | |
|---|---|---|
| 2011/0221443 A1 | 9/2011 | Bittar et al. |
| 2012/0283952 A1 | 11/2012 | Tang et al. |
| 2013/0054145 A1 | 2/2013 | Bittar et al. |
| 2013/0144530 A1 | 6/2013 | Bittar et al. |
| 2013/0169278 A1 | 7/2013 | Bittar et al. |
| 2013/0311094 A1 | 11/2013 | Donderici et al. |
| 2015/0309201 A1 | 10/2015 | Wu et al. |
| 2015/0322774 A1 | 11/2015 | Wu et al. |
| 2016/0033669 A1 | 2/2016 | Bittar et al. |
| 2016/0370490 A1 | 12/2016 | Bittar |
| 2017/0123096 A1 | 5/2017 | Wilson et al. |
| 2017/0342826 A1 | 11/2017 | Wilson et al. |
| 2018/0258755 A1 | 9/2018 | Donderici et al. |
| 2018/0283170 A1 | 10/2018 | Donderici et al. |
| 2018/0292558 A1* | 10/2018 | Wilson ................. H01Q 21/064 |
| 2018/0294791 A1* | 10/2018 | Pan ......................... H03H 7/38 |
| 2019/0353820 A1* | 11/2019 | Chen .................. G01N 33/2823 |
| 2021/0041592 A1* | 2/2021 | Wilson ..................... G01V 3/38 |
| 2021/0047921 A1 | 2/2021 | Bittar et al. |
| 2021/0055449 A1 | 2/2021 | Guner et al. |

(Continued)

OTHER PUBLICATIONS

International Search Report and Written Opinion for International Application No. PCT/US2022028752 dated Jan. 26, 2023.

(Continued)

*Primary Examiner* — Douglas X Rodriguez
(74) *Attorney, Agent, or Firm* — John Wustenberg; C. Tumey Law Group PLLC

(57) ABSTRACT

A borehole imaging tool may include a plurality of resonator antennas for taking one or more downhole measurements disposed on a supporting structure of the borehole imaging tool. Additionally, each of the plurality of resonator antennas are separated into two or more groups of resonator antennas and each of the two or more groups of resonator antennas operate at a resonance frequency different from one another.

20 Claims, 6 Drawing Sheets

(56) References Cited

U.S. PATENT DOCUMENTS

2021/0088686 A1* 3/2021 Samson .............. G06F 18/2411
2021/0140301 A1 5/2021 Guner et al.
2021/0405016 A1 12/2021 Capoglu et al.
2022/0025763 A1 1/2022 Bittar et al.
2022/0107441 A1 4/2022 Guner et al.

OTHER PUBLICATIONS

C.A. Balanis, "Antenna Theory: Analysis Design", Third Edition, John Wiley & Sons, Inc., 2005.
D.K. Cheng, "Field and Wave Electromagnetics", Second Edition, Pearson New International Edition, 2014.
Schlumberger, QuantaGeo, Aug. 2014. Available at https://www.slb.com/newsroom/press-release/2014/or-2014-0825-quanta-geo, Accessed Apr. 15, 2022.
Baker Hughes, GeoXplorer imaging service, Accessed Feb. 2022, Available at https://www.bakerhughes.com/evaluation/wireline-openhole-logging/wireline-imaging/geoxplorer-imaging-service.
Halliburton, StrataXaminer Imaging Service, H013996, Jun. 2021.
Halliburton, Omri, Oil Mud Reservoir Imager Tool, Accessed Feb. 2022, Available at https://hesp.com/index.php/services/open-hole/imaging/omri-ia-logiq-oil-based-mud-reservoir-imager.

* cited by examiner

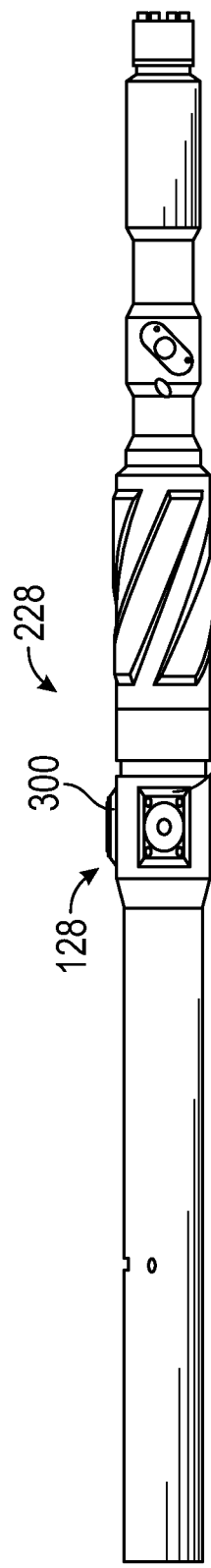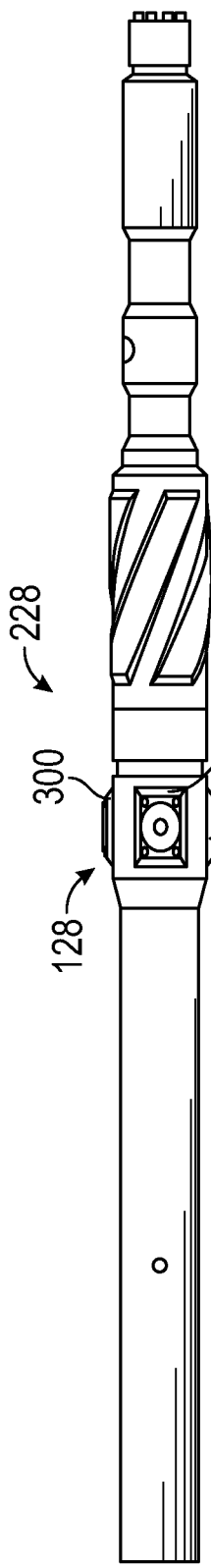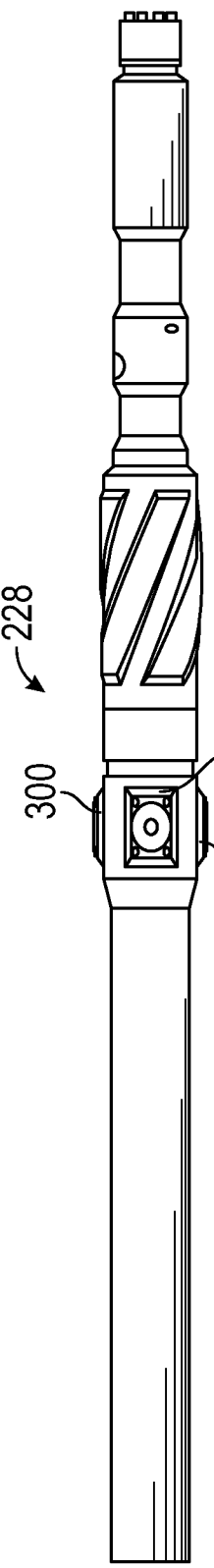

MULTI-FREQUENCY BOREHOLE IMAGERS UTILIZING RESONATOR ANTENNAS

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a resistivity image of the formation immediately surrounding the borehole. Borehole imager tools may be used to determine formation stratigraphy, dips of the formation layers as well as, borehole and formation stress. During drilling operations borehole imager tools may be particularly important in learning about thin beds, fracture locations, and low resistivity formations. To detect thin beds, fracture locations, and low resistivity formations borehole imager may transmit a current through an injector electrode into the formation. A return electrode may record the current after the current has passed through the formation. Measuring this current may allow an operator to determine characteristic and properties of thin beds, fracture locations, and low resistivity formations. Generally, these measurements may be displayed as an image.

However, electrode-based imaging tools may be subject to current leakage through the support structure on which an electrode may be disposed. To prevent and/or reduce current leakage, non-conductive material may be utilized on the support structure. Additionally, electrode-based imaging tools may only be useful in mud-based environments. An imaging tool that may be utilized in oil-based or water-based environment that reduces current leakage may be advantageous for imaging operations downhole.

BRIEF DESCRIPTION OF THE DRAWINGS

For a detailed description of the examples of the disclosure, reference will now be made to the accompanying drawings in which:

FIGS. 3A-3C illustrate an example of a pad;

DETAILED DESCRIPTION

The present disclosure discloses a system and method for utilizing one or more resonator antennas for measurement operations in a wireline and/or logging-while-drilling operation. As discussed below, resonator antennas may have a low profile and may be easy to manufacture while providing a high signal-to-noise ratio while reducing current leakage into a support structure. In examples, resonator antennas may operate and function in oil-based mud and/or water-based mud. Additionally, resonator antennas may be configured and/or manufactured to produce a plurality of frequencies, where the plurality of frequencies may resolve ambiguities in identifying mud and formation properties and the determination of the dispersion relations.

Figure 1:
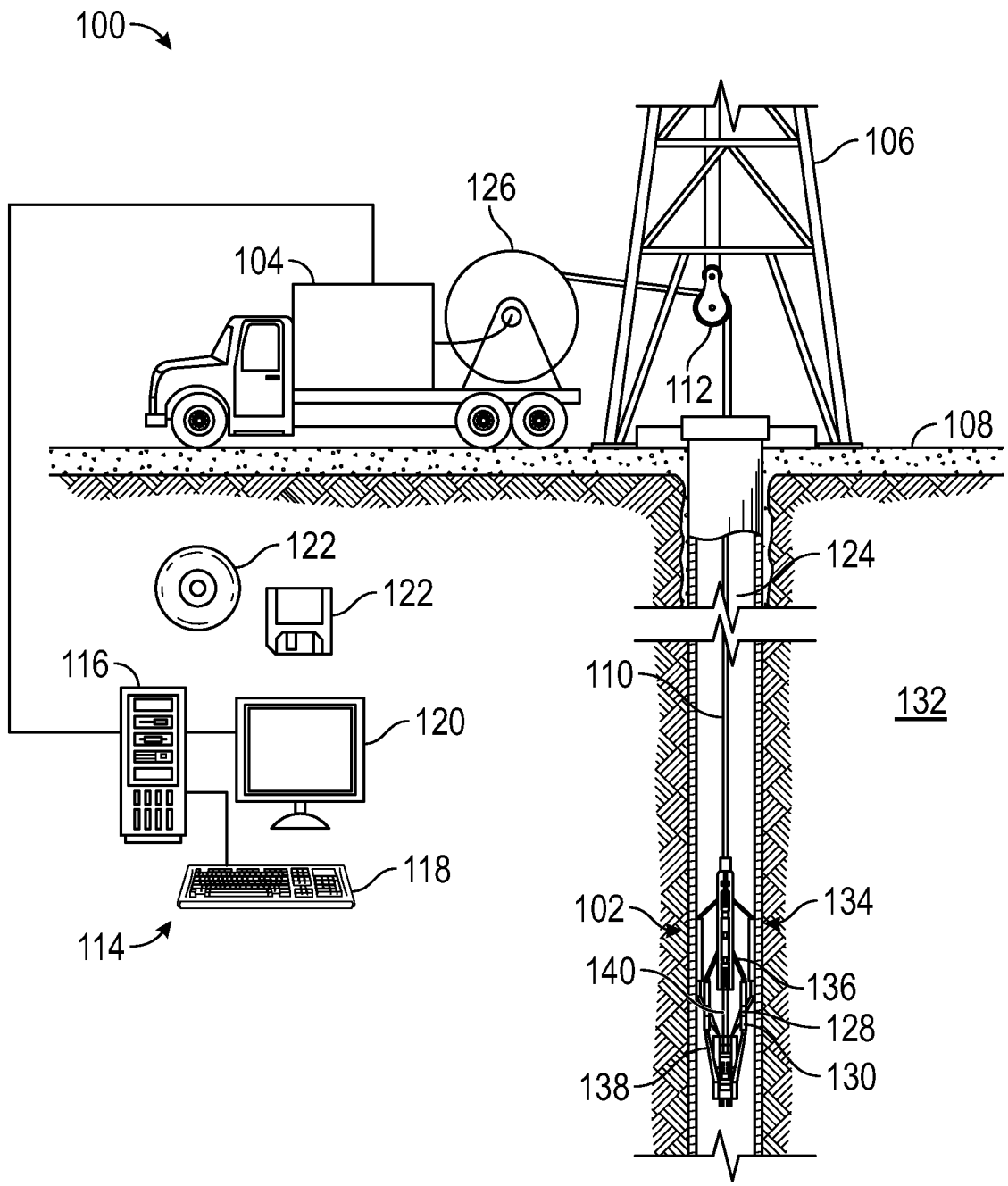
FIG. 1 illustrates an example of a well measurement system.

FIG. 1 illustrates a cross-sectional view of an example of a well measurement system 100. As illustrated, well measurement system 100 may comprise borehole imaging tool 102 attached to a vehicle 104. As discussed below, borehole imaging tool 102 may be a resistivity imager, impedance imager, and/or the like. In examples, it should be noted that borehole imaging tool 102 may not be attached to a vehicle 104. Borehole imaging tool 102 may be supported by rig 106 at surface 108. Borehole imaging tool 102 may be tethered to vehicle 104 through conveyance 110. Conveyance 110 may be disposed around one or more sheave wheels 112 to vehicle 104. Conveyance 110 may comprise any suitable means for providing mechanical conveyance for borehole imaging tool 102, including, but not limited to, wireline, slickline, coiled tubing, pipe, drill pipe, drill string, downhole tractor, or the like. In some examples, conveyance 110 may provide mechanical suspension, as well as electrical connectivity, for borehole imaging tool 102.

Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and borehole imaging tool 102.

Conveyance 110 may lower borehole imaging tool 102 in borehole 124. Generally, borehole 124 may comprise horizontal, vertical, slanted, curved, and other types of borehole geometries and orientations. Imaging tools may be used in uncased sections of the borehole. Measurements may be made by borehole imaging tool 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

Information from borehole imaging tool 102 may be gathered and/or processed by information handling system 114. For example, signals recorded by borehole imaging tool 102 may be stored on memory and then processed by borehole imaging tool 102. The processing may be performed real-time during data acquisition or after recovery of borehole imaging tool 102. Processing may alternatively occur downhole or may occur both downhole and at surface. In some examples, signals recorded by borehole imaging tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to borehole imaging tool 102.

Systems and methods of the present disclosure may be implemented, at least in part, with information handling system 114. While shown at surface 108, information handling system 114 may also be located at another location, such as remote from borehole 124. Information handling system 114 may comprise any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may comprise random access memory (RAM), one or more processing resources such as a central processing unit (CPU) or hardware or software control logic, ROM, and/or other types of nonvolatile memory. Additional components of the information handling system 114 may comprise one or more disk drives, one or more network ports for communication with external devices as well as an input device 118 (e.g., keyboard, mouse, etc.) and video display 120. Information handling system 114 may also comprise one or more buses operable to transmit communications between the various hardware components.

Alternatively, systems and methods of the present disclosure may be implemented, at least in part, with non-transitory computer-readable media 122. Non-transitory computer-readable media 122 may comprise any instrumentality or aggregation of instrumentalities that may retain data and/or instructions for a period of time. Non-transitory computer-readable media 122 may comprise, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high-resolution resistivity image of formation 132 immediately surrounding borehole 124. The high-resolution resistivity image may depict boundaries of subsurface structures, such as a plurality of layers disposed in formation 132. These formation images may be used in reservoir characterization. Formation images with high resolution may allow accurate identification of thin beds and other fine features such as fractures, clasts and vugs. These formation images may provide information about the sedimentology, lithology, porosity and permeability of formation 132. The formation images may complement, or in some cases replace, the process of coring.

Borehole imaging tool 102 may comprise a plurality of resonator antennas 128, which may be disposed on each pad 134 in any suitable order. For example, a pad 134 may comprise only one resonator antenna 128 and/or a plurality of resonator antennas 128. Pads 134 may attach to a mandrel 140 of borehole imaging tool 102 through upper arm 136 and lower arm 138. It should be noted that mandrel 140 may be defined as the supporting structure of borehole imaging tool 102 which may act as a platform for any peripheral (e.g., upper arm 136, lower arm 138, conveyance 110, etc.) to attach to borehole imaging tool 102. Upper arm 136 and lower arm 138 may extend pad 134 away from downhole tool 102. In examples, both upper arm 136 and lower arm 138 may place pad 134 in contact with borehole 124. It should be noted that there may be any suitable number of arms and/or extensions that may be used to move pad 134 away from downhole tool 102 and in close proximity with borehole 124, or vice versa.

In examples, borehole imaging tool 102 may operate with additional equipment (not illustrated) on surface 108 and/or disposed in a separate well measurement system (not illustrated) to record measurements and/or values from formation 132 to render a resistivity image of formation 132. Without limitation, borehole imaging tool 102 may be connected to and/or controlled by information handling system 114, which may be disposed on surface 108. Without limitation, information handling system 114 may be disposed down hole in borehole imaging tool 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until borehole imaging tool 102 may be brought to surface 108. In examples, information handling system 114 may communicate with borehole imaging tool 102 through a fiber optic cable (not illustrated) disposed in (or on) conveyance 110. In examples, wireless communication may be used to transmit information back and forth between information handling system 114 and borehole imaging tool 102. Information handling system 114 may transmit information to borehole imaging tool 102 and may receive as well as process information recorded by borehole imaging tool 102. In examples, a downhole information handling system (not illustrated) may comprise, without limitation, a microprocessor or other suitable circuitry, for estimating, receiving and processing signals from borehole imaging tool 102. Downhole information handling system (not illustrated) may further comprise additional components, such as memory, input/output devices, interfaces, and the like. In examples, while not illustrated, borehole imaging tool 102 may comprise one or more additional components, such as analog-to-digital converter, filter and amplifier, among others, which may be used to process the measurements of borehole imaging tool 102 before they may be transmitted to surface 108. Alternatively, raw measurements from borehole imaging tool 102 may be transmitted to surface 108.

Any suitable technique may be used for transmitting signals from borehole imaging tool 102 to surface 108. As illustrated, a communication link (which may be wired or wireless and may be disposed in conveyance 110, for example) may be provided that may transmit data from borehole imaging tool 102 to an information handling system 114 at surface 108.

Figure 2:
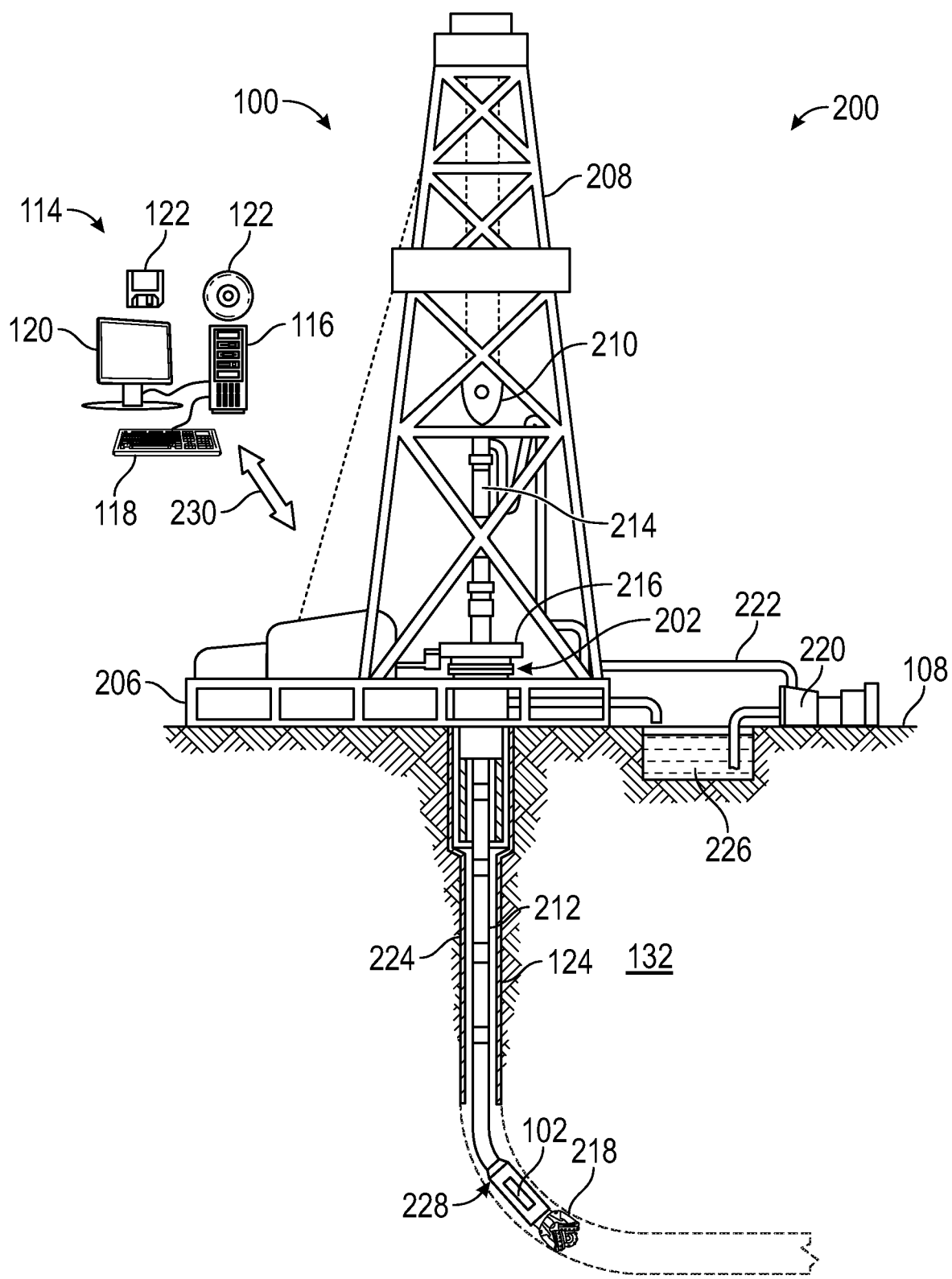
FIG. 2 illustrates another example of a well measurement system.

FIG. 2 illustrates an example in which borehole imaging tool 102 may be disposed in a drilling system 200. As illustrated, borehole 124 may extend from a wellhead 202 into formation 132 from surface 108. As illustrated, a drilling platform 206 may support a derrick 208 having a traveling block 210 for raising and lowering drill string 212. Drill string 212 may comprise, but is not limited to, drill pipe and coiled tubing, as generally known to those skilled in the art. A kelly 214 may support drill string 212 as it may be lowered through a rotary table 216. A drill bit 318 may be attached to the distal end of drill string 212 and may be driven either by a downhole motor and/or via rotation of drill string 212 from surface 108. Without limitation, drill bit 218 may comprise, roller cone bits, PDC bits, natural diamond bits, any hole openers, reamers, coring bits, and the like. As drill bit 218 rotates, it may create and extend borehole 124 that penetrates various formations 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108. Drill bit 218 may be a part of bottom hole assembly 228 at distal end of drill string 212. Bottom hole assembly 228 may further comprise borehole imaging tool 102. Borehole imaging tool 102 may be disposed on the outside and/or within bottom hole assembly 228. Borehole imaging tool 102 may comprise test cell 234. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 114, which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may comprise, without limitation, a microprocessor or other suitable circuitry, for estimating, receiving and processing signals from bottom hole assembly 228. Downhole information handling system (not illustrated) may further comprise additional components, such as memory, input/output devices, interfaces, and the like. In examples, while not illustrated, bottom hole assembly 228 may comprise one or more additional components, such as analog-to-digital converter, filter and amplifier, among others, which may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may comprise a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may comprise a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

FIGS. 3A-3C illustrate an example of bottom hole assembly 228 that comprises an example of a logging-while-drilling (LWD) and/or measuring-while-drilling (MWD) imaging oil-based mud imager tool. Water based mud imagers may have similar designs, and may generally provide less design and interpretation complications than oil-based mud imagers due to the conductive nature of the water-based mud. As described below, bottom hole assembly 228 may provide a high-resolution image of borehole 124 (e.g., referring to FIG. 2) and may be used to identify damaged sections of borehole 124. This may provide knowledge on thin beds in formation 132 and also provide images that may be used to determine a dip angle of formation beds. In an LWD environment, the sensor topology may have minimum complexity, and may not rely on contact with borehole 124 (e.g., referring to FIG. 2). Measurement operations, as discussed below may be performed by one or more resonant antennas 128 that may be disposed on bottom hole assembly 228. Resonant antennas 128 may be disposed on a blade 300 on bottom hole assembly 228, which is discussed below. Resonator antennas 128 have the advantages of being low-profile, easy to manufacture, having a high signal-to-noise ratio and being less affected by the current leakage through the tool body of borehole imaging tool 102.

Resonator antennas 128 may take the form of a microstrip patch antenna or a conducting cavity-backed slot antenna. A microstrip patch antennas may operate between 10 MHz to 300 GHz. These high frequencies may be more suitable for imaging applications in oil-based mud environments. However, operation in water-based mud environments may also be possible.

Figure 4:
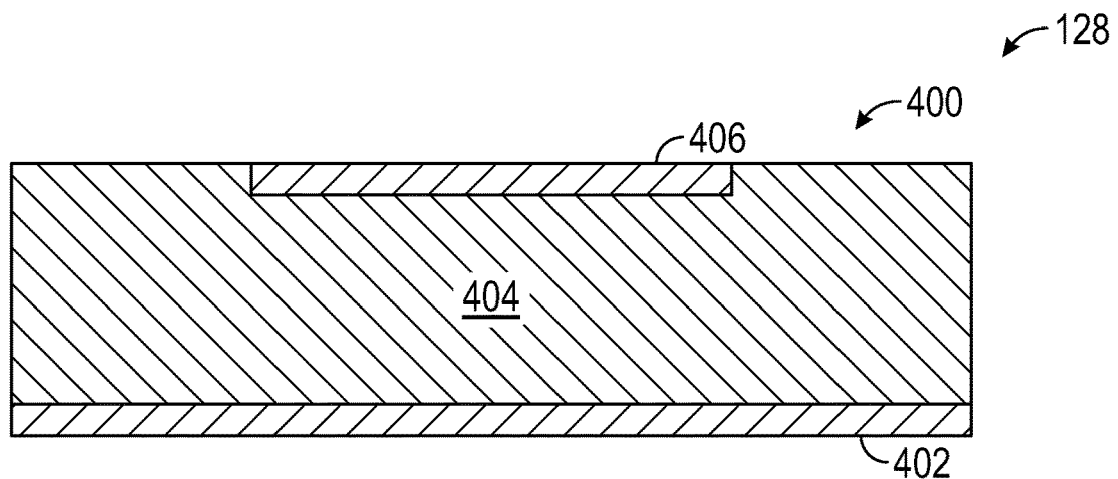
FIG. 4 illustrates a microstrip patch resonator antenna.

FIG. 4 illustrates and example of a microstrip patch antenna 400, which is a type of resonator antenna 128. As illustrated, a microstrip patch antenna 400 may comprise a metallic ground plane 402, a dielectric substrate 404, and a conductive patch 406 on top of dielectric substrate 404. A reflectometry measurement may be made with microstrip patch antenna 400 by measuring one or more S-parameters (for example, S11 is the reflection coefficient of the signal at the feeding port) for different formations. A S-parameters is an acronym for scattering parameters and $S_{ij}$ denote the ratio of the reflected power wave at port i to incident power wave at port j of a circuit while all the ports other than port j are terminated in matched loads. As microstrip patch antenna 400 constitute a dielectric cavity, they may resonate at a specific frequency. Resonance frequency of microstrip patch antenna 400 is a function of its geometry and the materials forming microstrip patch antenna 400. In particular, resonance frequency is inversely proportional to the length of the microstrip patch antenna 400 and the dielectric constant of dielectric substrate 404. Other parameters of the antenna geometry or the properties of the materials, such as the magnetic permeability of dielectric substrate 404, may also be modified in some implementations. Thus, the resonance frequency of a microstrip patch antenna 400 may change by changing one or more properties of microstrip patch antenna 400. Properties may comprise, but are not limited to, a width, a length, and/or a thickness. The magnitude and phase of the reflection coefficient at the feeding port (referred to as S11 parameter) may be affected by the properties of the formation that the electromagnetic waves are being transmitted. As a result, measured S-parameters also vary with the electrical properties of the formation. Thus, an indirect image of the formation electrical properties may be obtained by plotting the measured S-parameters.

Although not illustrated, slots may be cut on conductive patch 406 to facilitate the transmission of electromagnetic waves into the surrounding formation. Multiple slots may be present on conductive patch 406, which may change the operational characteristics of microstrip patch antenna 400. If there are multiple slots, the effective measurement point of microstrip patch antenna 400 may be considered to be the geometric center of the slots. A geometric center is a location after averaging out the position of each slot. However, since characteristics of the formation (and the borehole) immediately in front of each slot may be different, this is only an approximation.

Microstrip patch antennas 400 may be fed by microstrip lines, coaxial probes, aperture coupling or proximity coupling. Photoetching may be used for implementing patch and the feed lines on the dielectric substrate. Additionally, microstrip patch antennas 400 may comprise conducting vias around a conducting patch 406 to reduce the radiation loss from the microstrip patch antenna 400.

Figure 5:
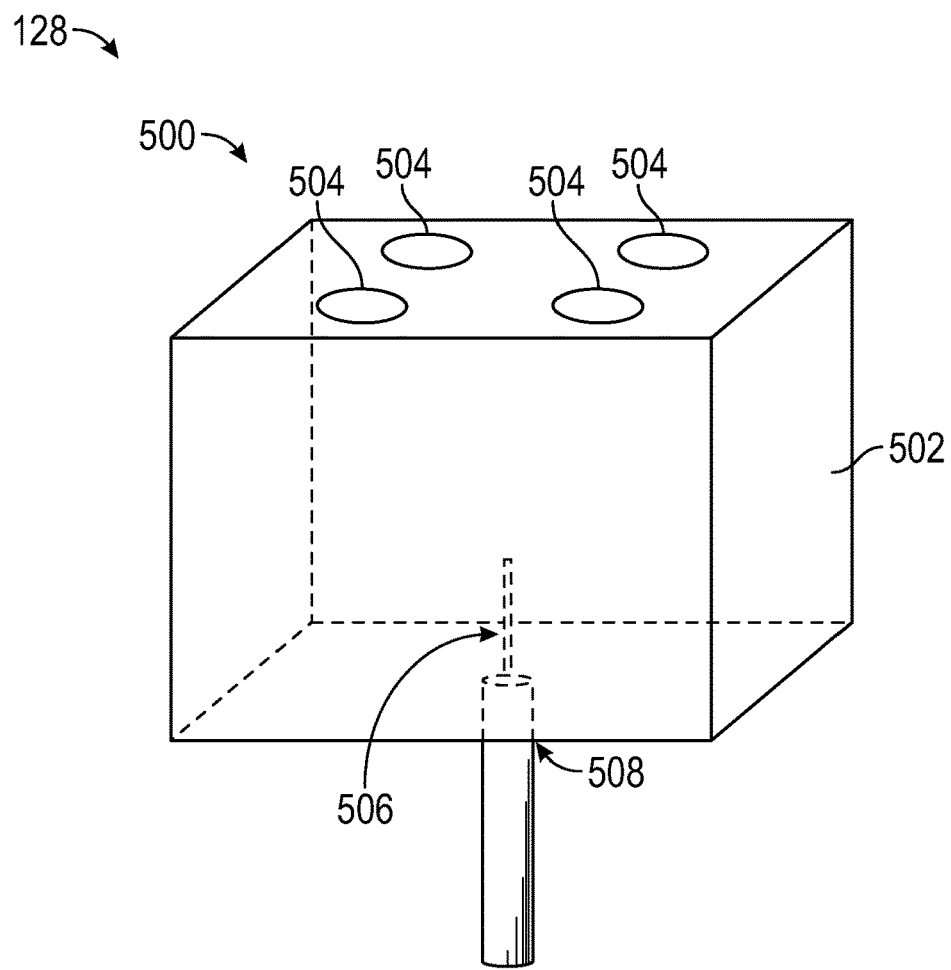
FIG. 5 illustrates an example of a resonator antenna that is a cavity resonator.

FIG. 5 illustrates an example of resonator antenna 128 that is a cavity resonator 500. As illustrated, cavity resonator 500 may comprise one or more conducting walls 502 with one or more slots 504. Slots are openings in the conducting wall that provides a path between the outside of the cavity resonator and its inside. As illustrated, conducting walls 502 may further comprise a hole or iris 508, which may feed (i.e., provide power to) cavity resonator 500 and radiating the electromagnetic energy. Cavity resonators 500 may also be referred to as cavity-backed slots. In the cavity-backed slot design, slots 504 may be the only openings on conducting walls 502 surrounding cavity resonator 500. As a result, radiation from cavity resonator 500 may occur from each slot 504. Cavity resonators 500 have high Q-factors. Q-factor (also referred to as the quality factor) is a measure of the ratio of the energy stored to energy lost in a resonant device and a higher Q-factor represents lower losses. As with the microstrip patch antenna 400 (e.g., referring to FIG. 4), as the dimensions of cavity resonator 500 and the dielectric constant of the material filling the inner cavity of cavity resonator 500 and slots 504 increases, the resonance frequency decreases. Thus, the resonance frequency of cavity resonator 500 may change by changing one or more properties of cavity resonator 500. Properties may comprise, but are not limited to, a width, a length, and/or a thickness. Such a resonator may also be fed through a feeding port or a waveguide 506 connected to a hole or iris 508 on the wall of slot 504. Coaxial probes, loops and aperture excitation may also be used for feeding cavity resonator 500. Filling slots 504 with different material of different dielectric constants may allow for cavity resonator 500 to emit at different frequencies.

Generally, borehole imaging tools 102 may operate at multiple frequencies in order to determine dispersion characteristics of the environment as well as resolve the ambiguities caused by the compensation effects between different unknowns. For a multi-frequency operation of a borehole imaging tool 102 that uses resonator antennas 128 as sensors, there may be multiple types (groups) of resonator antennas 128 with different physical characteristics. Thus, each resonator antenna 128 may be created for a certain frequency, different than other resonator antennas 128 at other groups given that they operate in the same environment. As mentioned previously, physical dimensions of resonator antennas 128 and the materials used for construction may be the primary parameters that determines the resonance frequency.

Figure 6C:
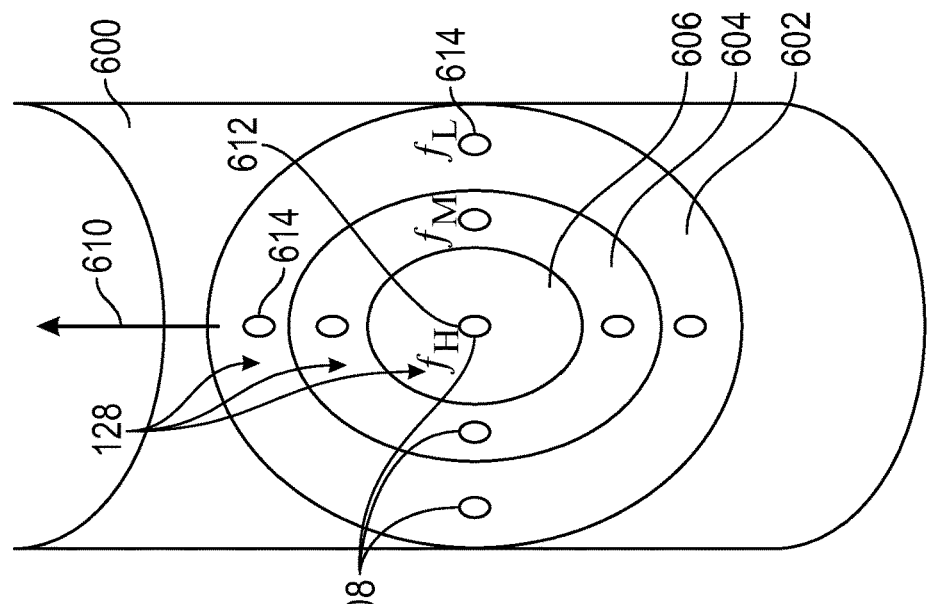
FIGS. 6A-6C illustrate an example of a plurality of resonator antennas disposed on a support structure.
Figure 6B:
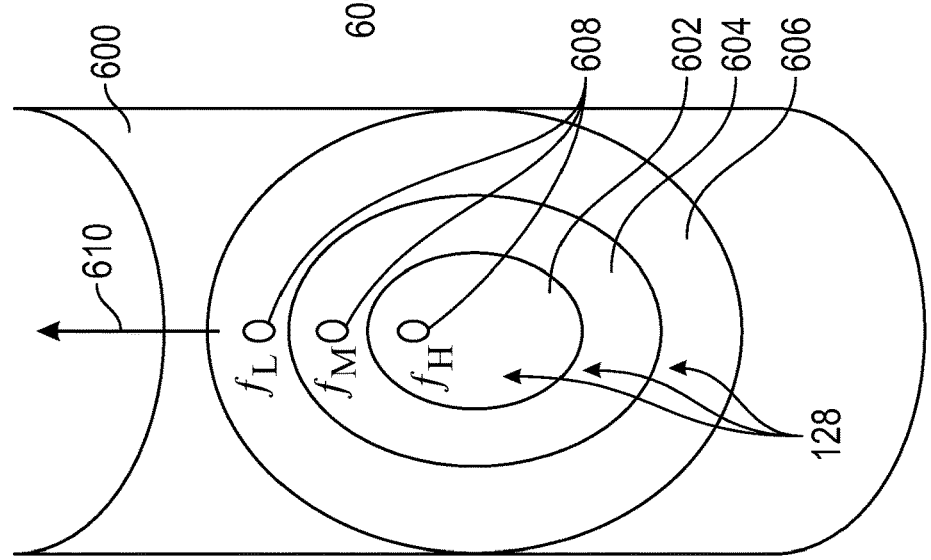
Figure 6A:
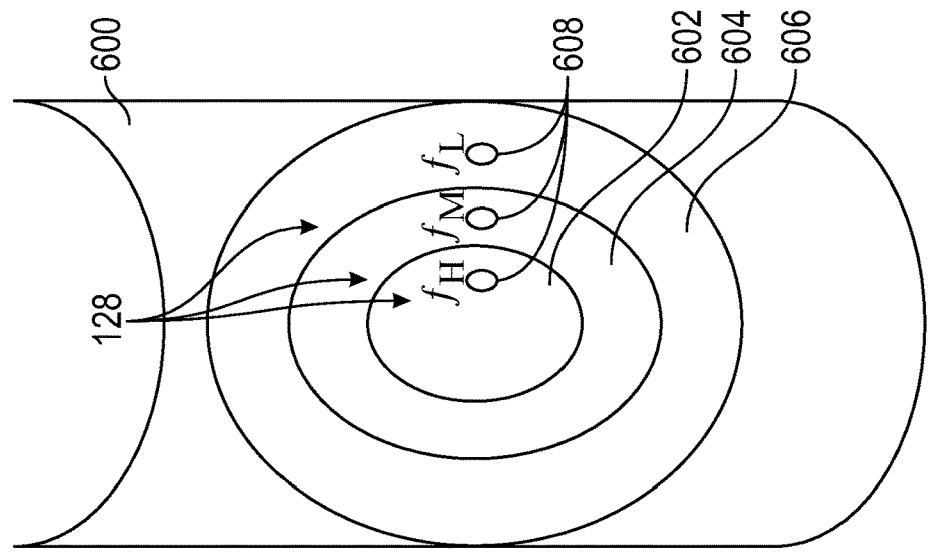

Although there may be multiple resonance frequencies (or a band of frequencies) of a single resonator antenna 128, it may not be feasible to tune these frequencies to an identified operating frequencies of borehole imaging tool 102. In order to make measurements at substantially similar locations at different frequencies, several different arrangements may be created. An implementation of the first arrangement is depicted in FIGS. 6A-6C. In this alignment, there exist three nested resonator antennas 128 on a supporting structure 600. Supporting structure 600 may be a pad 130 or a mandrel 140 of a wireline logging system (e.g., referring to FIG. 1) or a blade 300 disposed on bottom hole assembly 228 of a logging-while-drilling system (e.g., referring to FIG. 2). For wireline logging systems, pads 130 may be articulated to ensure a good contact between resonator antennas 128 and formation 132. This reduces the effect of the mud on the measurements and thus increase signal-to-noise ratio of the tool. For logging-while-drilling, measurement operations may be performed at a stand-off from borehole wall 124 and thus formation 132.

As illustrated in FIGS. 3A-3C, multi-frequency resonator antennas 128 may be located on one or more blades 300 of bottom hole assembly 228 for a logging-while-drilling (LWD) borehole imaging tool 102. A blade is a structure that is not flush with drill string 212 and/or bottom hole assembly 228 (e.g., referring to FIG. 2), which allow the blade to protrude outward from drill string 212 and/or bottom hole assembly 228. Additionally, blades may also be referred to as wings, tabs, externally protruding profiles, and/or housings. In examples, there may be four different blades 300 on bottom hole assembly 228. Furthermore, there may be a different resonator antenna 128 on each blade 300. In examples, there may be multiple resonator antennas 128 disposed on the same blade 300. In other examples, there may be multiple resonator antennas 128 operating at the same frequency located on different blades 300. Each resonator antenna 128 may have different dimensions/dielectric constant and thus may operate at a different frequency. As bottom holes assembly 228 rotates during drilling, each resonator antenna 128 may make measurements at a faster speed than the drilling rate in order to make multiple measurements around the azimuth of borehole imaging tool 102 at substantially the same point. For example, the azimuth of borehole imaging tool 102 may be divided into 180 azimuthal bins. As bottom hole assembly 228 rotates at substantially the same depth point (which depends on the vertical resolution of borehole imaging tool 102), multiple measurements from the same azimuthal bin location may be obtained for each resonator antenna 128. These measurements may be averaged to reduce the noise in the measurements.

Referring back to FIGS. 6A-6C, the face of resonator antennas 128 are shown to be circular, but they may be any other shape, such as an ellipse, rectangle or a square. Similarly, although they are shown to be concentric, they may be at any given location on supporting structure 600. Additionally, there may be a plurality of resonator antennas 128 in proximity to one another but not nested. The resonance frequency of resonator antennas 128 may be inversely proportional to their physical sizes. Thus, smallest resonator antenna 602 (innermost cavity) may resonate at a higher frequency $f_H$, second largest resonator antenna 604 may resonate at a middle frequency $f_M$, and largest resonator antenna 606 may resonate at a lower frequency $f_L$. A slot 608 may be opened on each resonator antenna 128 to enable the radiation of the electromagnetic waves, as discussed above. Slots 608 of each resonator antenna 128 may be located at the same axial position. Slots 608 may be located close to each other, and the measurements may be assumed to be performed at the same azimuthal position for different frequencies. There may be multiple such nested antenna structures on resistivity imager tool 102 separated azimuthally to obtain multiple measurements in the azimuthal direction for each group of resonator antennas 128 (i.e., at each frequency.) For a LWD tool (i.e., referring to FIGS. 3A-3C), tool rotation may enable multiple making multiple measurements along azimuth using a single resonator antenna 128. Thus, a single nested antenna structure may be enough to make a multi-frequency measurement. As the LWD tool rotates, the angular position of the tool is recorded, and the azimuth angle of each slot 608 may be computed accordingly. Measurements from different slots 608 may be interpolated and aligned to the same azimuth angle. Although there are three groups of resonator antennas 128 (operating at three different frequencies) in this example, there may be any number of nested resonator antennas 128 in other implementations which may enable measurements at different number of frequencies.

FIG. 6B illustrates another alignment of slots 608 for resonator antennas 128 that are aligned at the same azimuthal location on tool axis 610. Similar to FIG. 6A, slots 608 of each nested resonator antenna 128 arrangement may be located at close proximity to each other and may be assumed to be at the same axial position during processing. As borehole imaging tool 102 is logged in the borehole, the depth of borehole imaging tool 102 may be recorded, and the depth of each slot 608 with respect to the formation may be computed accordingly. Measurements from different slots 608 are interpolated and aligned to the same depth. In these alignments of slots 608 for FIG. 6A and FIG. 6B, only a single slot 608 has been depicted for each resonator antenna 128. It may be possible to have multiple slots 608 in other arrangement schemes. For example, in the alignment depicted in FIG. 6C, largest resonator antenna 602 and second largest resonator antenna 604 each have four slots 608. These slots 608 may be arranged in a symmetric manner such that their geometric center (e.g., the average of the positions of slots 608) lies on the same location as a single slot 612 located in smallest resonator antenna 602. As a result, the measurement point of outer two sensors 614 may be assumed to be the same as smallest resonator antenna 602. However, the separation between slots 612 and outer two sensors 614 in this example may decrease the resolution of borehole imaging tool 102 of measurements taken during measurement operations. Measurements taken by resonator antennas 128 may be processed to produce one or more images of formation parameters.

Figure 7:
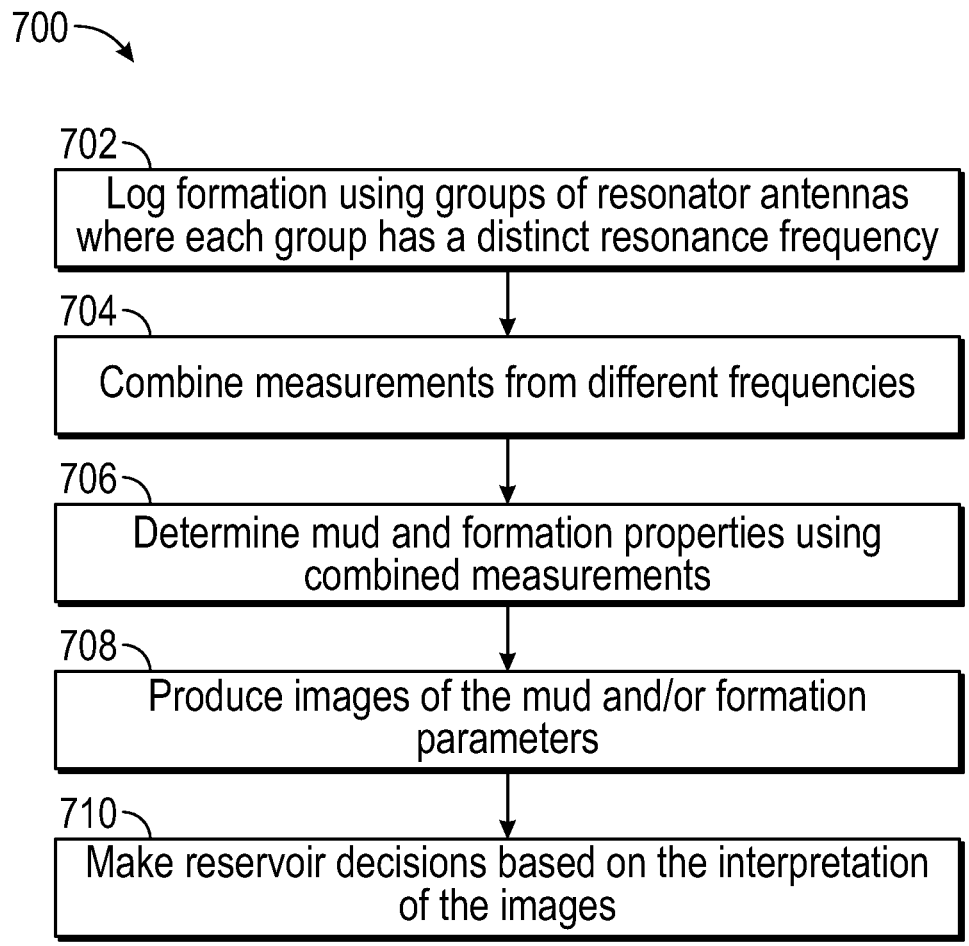
FIG. 7 illustrates a workflow for processing measurements taken by borehole imaging tool.

FIG. 7 illustrates a workflow 700 for processing measurements taken by borehole imaging tool 102. Workflow 700 may begin with block 702, in which a formation is logged using groups of resonator antennas 128 where each group has a distinct resonance frequency. Measurements taken by a single or multiple resonator antennas 128 may be stored downhole on an information handling system 114 or may be sent uphole to information handling system 114. In examples, there may be a plurality of information handling systems 114 that may be disposed both downhole and uphole, which may communicate with each other. Measurements taken from measurement operations may comprise the measured data, measurement's location, and the measurements time. In block 704, the measurements taken in block 702 may be combined with measurements from different frequencies using information handling system 114.

In block 706, the combined measurements from block 704 may be used to determine stand-off as well as mud properties such as mud resistivity, mud permittivity, mud angle (i.e., phase of the mud impedance), mud loss tangent and formation properties such as formation resistivity, formation permittivity, formation angle, and formation loss tangent. This may be performed by processing the measurements through an inversion process on information handlining systems 114. To perform the inversion, a forward model may be used. Response of borehole imaging tool 102 may be simulated for inversion using a forward model, such as one that may be obtained with a 3D electromagnetic simulation software. Model parameters (in this case, model parameters refer to the variable properties of the formation and/or mud such as formation resistivity, formation permittivity, formation loss tangent, standoff, mud angle, mud permittivity, mud resistivity etc.) that minimize the difference between the measurements and the model response corresponding to these parameters may be returned as the inversion output. An iterative process may be used for this purpose, such as the Gauss-Newton method. Note that the model responses may be simulated beforehand within a grid in the expected parameter range. Then, the response for identified parameters may be found via multidimensional interpolation if it does not lie on the grid. Equation 1, seen below mathematically shows the inversion process.

$$\arg\min_{\overline{\overline{X}}} \|\overline{\overline{I}} - \overline{\overline{I}}^M(\overline{\overline{X}})\| \qquad (1)$$

In Equation 1, a parameter set is found (i.e., $\overline{\overline{X}}$, where the double overbar represents that parameter set may be a matrix) that minimize the difference between the measurements of the imager (denoted as $\overline{\overline{I}}$) and the modeled response ($\overline{\overline{I}}^M$) corresponding to a given parameter set. Generally, a vector is a special case of a matrix with a single row in the case of a column vector or a single column in the case of a row vector. Furthermore, matrices may be flattened to obtain vectors. Thus, these two terms are used interchangeably in this disclosure. Double bars denote the norm operation (i.e., minimization is in the least squares sense) which is one of the possible implementations. The function that is minimized is called the cost function. In some implementations, a regularization term may be added to the cost function. Inversion may be done on a pixel-by-pixel basis (i.e., parameter set may be solved for each measurement point on an image.) In other implementations, some of the parameters may be assumed to be constant over a zone of measurements. For example, mud parameters may be assumed to be a constant over an interval of about 100 feet (about 30 meters). However, the constant may be over any identified interval chosen by personnel. Additionally, regularization may also be used to constrain sudden jumps in inverted parameters. Note that measurement matrix (and the corresponding modeled response) may comprise elements from each of the available frequencies. During measurement operations, the number of measurements may be equal to or exceeding the number of unknowns. Otherwise, Equation (1) may be under-determined, and a solution may not be obtained. In some cases, data from some frequencies may have higher weights in Equation (1) than the others. For example, weights may be determined based on a noise estimate of the given frequency. In cases when a group of sensors corresponding to a given frequency may be noisy or malfunctioning, they may be dropped altogether from the solution.

In other implementations, a regression function may be trained based on machine learning algorithms using either simulated data as described above or using measurements in known environments. Once actual measurements are made, they may be plugged into the regression function to find the unknown formation and/or mud parameters as outputs. Algorithms such as neural networks, random forests or support vector regression techniques may be used for this purpose. In some implementations, more than one regression function may be trained. Output of these regression functions may be a subset of the unknown mud and/or formation properties that are being derived. Inputs of these regression functions may also be different. For example, measurements from a different subset of frequencies may be used as inputs for different regression functions based on the sensitivities of their outputs to these frequencies.

Utilizing an inversion or machine learning algorithm in block 706 may produce a data set that is processed in block 708 to produce images of the mud and/or formation properties. Mud and formation properties may be produced to illustrate properties of formation 132 (e.g., referring to FIG. 1) surrounding borehole 124 (e.g., referring to FIG. 1) with respect to the azimuth angle and the depth for each group of resonator antennas 128 (i.e., each frequency). As mentioned previously, images may be images of S-parameters of borehole imaging tool 102. The resulting solution of mud and formation properties may also be presented as images with respect to tool depth and azimuth. In block 710, the images from block 708 may be used for interpretation of the well characteristics by geologists and reservoir analysts. Formation stratigraphy, presence of fractures, washouts or breakout zones may be determined using such images.

As discussed above, improvements over current technology may be found in the arrangement of resonator antennas on wireline or logging-while-drilling applications. In examples, a plurality of resonator antennas at different resonance frequencies may be used during measurement operations. To create multiple frequencies, multiple cavity antennas with conducting walls may be utilized for imaging purposes. Further, improvement over current technology may be seen in the placement of resonator antennas. In examples, resonator antennas may be placed in a nested manner where each of the nested antennas has a different resonance frequency. Placement of resonator antennas on one or more blades of a bottom hole assembly may allow for images to be taken during drilling operations. Additionally, resonator antennas may be aligned with other resonator antennas operating at different resonance frequencies axially or azimuthally. Aligning of resonator antennas may be performed such that the geometric center of the slots on the antenna surfaces may be essentially the same position (thus, antennas have the same measurement location, albeit with different resolutions.) Essentially the same position is defined as the distance between the geometric centers of the two resonator antennas are less than half of the resolution of the tool, such that the geometric considers may be considered to be at essentially the same position. For example, modern resistivity imaging tools have resolutions in the order of an inch in both the azimuthal and the axial directions. For such a tool with a 1-inch (0.03 meter) resolution in both the azimuthal and the axial directions, the geometric centers of the two resonator antennas should be within 0.5 inches (0.01 meter) of each other in both the azimuthal and the axial directions. If a higher resolution is desired, the tolerance in the position of the geometric centers should be reduced accordingly.

Additionally, an inversion scheme may be utilized to obtain mud and/or formation properties from measurements. Likewise, machine learning algorithms may be used to obtain mud and/or formation properties from measurements. The methods and systems may comprise any of the various features disclosed herein, including one or more of the following statements.

Statement 1. A borehole imaging tool may comprise a plurality of resonator antennas for taking one or more downhole measurements disposed on a supporting structure of the borehole imaging tool, wherein each of the plurality of resonator antennas are separated into two or more groups of resonator antennas and each of the two or more groups of resonator antennas operate at a resonance frequency different from one another.

Statement 2. The borehole imaging tool of statement 1, wherein the plurality of resonator antennas are microstrip patch resonators.

Statement 3. The borehole imaging tool of statement 2, further comprising one or more slots cut into each of the plurality of resonator antennas.

Statement 4. The borehole imaging tool of statement 3, wherein the one or more slots for a first resonator antenna from a first group of resonator antennas define a first geometric center, the one or more slots for a second resonator antenna from a second group of resonator antennas define a second geometric center, and the first geometric center and the second geometric center are at essentially the same position.

Statement 5. The borehole imaging tool of any previous statements 1 or 2, wherein the plurality of resonator antennas are cavity resonators.

Statement 6. The borehole imaging tool of statement 5, further comprising one or more slots cut into each of the plurality of resonator antennas.

Statement 7. The borehole imaging tool of statement 6, wherein the one or more slots for a first resonator antenna from a first group of resonator antennas define a first geometric center, the one or more slots for a second resonator antenna from a second group of resonator antennas define a second geometric center, and the first geometric center and the second geometric center are at essentially the same position.

Statement 8. The borehole imaging tool of any previous statements 1, 2, or 5, wherein the resonance frequency is changed by adjusting a property of a resonator antenna.

Statement 9. The borehole imaging tool of any previous statements 1, 2, 5, or 8, wherein the resonance frequency is changed by adjusting a dielectric constant of a resonator antenna.

Statement 10. The borehole imaging tool of any previous statements 1, 2, 5, 8, or 9, wherein the two or more groups of resonator antennas are disposed axially on the supporting structure such that at least one resonator antenna from each of the two or more groups of resonator antennas have the same azimuthal position.

Statement 11. The borehole imaging tool of any previous statements 1, 2, 5, or 8-10, wherein the two or more groups of resonator antennas are disposed azimuthally on the supporting structure such that at least one resonator antenna from each of the two or more groups of resonator antennas have the same axial position.

Statement 12. The borehole imaging tool of any previous statements 1, 2, 5, or 8-11, wherein the borehole imaging tool is a wireline tool.

Statement 13. The borehole imaging tool of statement 12, wherein the supporting structure is a pad.

Statement 14. The borehole imaging tool of any previous statements 1, 2, 5, or 8-12, wherein the borehole imaging tool is a logging while drilling (LWD) tool.

Statement 15. The borehole imaging tool of statement 14, wherein the plurality of resonator antennas are disposed on one or more blades, and wherein the one or more blades are disposed on a bottom hole assembly of the logging while drilling tool.

Statement 16. The borehole imaging tool of statement 15, wherein the two or more groups of resonator antennas are disposed on the one or more blades.

Statement 17. The borehole imaging tool of any previous statements 1, 2, 5, 8-12, or 14, further comprising an information handling system communicatively connected to the borehole imaging tool and wherein the information handling system performs an inversion using the one or more downhole measurements to determine a mud property or a formation property.

Statement 18. The borehole imaging tool of statement 17, wherein the information handling system further plots the mud property or the formation property as an image.

Statement 19. The borehole imaging tool of any previous statements 1, 2, 5, 8-12, 14, or 17, further comprising an information handling system communicatively connected to the borehole imaging tool and wherein the information handling system identifies a regression function by training a machine learning algorithm, and wherein the one or more downhole measurements are utilized as one or more inputs for the regression function to identify a mud property of a formation property as one or more outputs of the regression function.

Statement 20. The borehole imaging tool of claim 19, wherein the information handling system further identifies a plurality of regression functions and each of the plurality of regression functions has a different subset of the mud property or the formation property as the one or more outputs of the plurality of regression functions.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A borehole imaging tool comprising,
    a plurality of resonator antennas for taking one or more downhole measurements disposed on a supporting structure of the borehole imaging tool,
    wherein at least one of the resonator antennas from the plurality of resonator antennas is nested, and wherein each of the plurality of resonator antennas are separated into two or more groups of resonator antennas and each of the two or more groups of resonator antennas operate at a resonance frequency different from one another.

2. The borehole imaging tool of claim 1, wherein the plurality of resonator antennas are microstrip patch resonators.

3. The borehole imaging tool of claim 2, further comprising one or more slots cut into each of the plurality of resonator antennas.

4. The borehole imaging tool of claim 3, wherein the one or more slots for a first resonator antenna from a first group of resonator antennas define a first geometric center, the one or more slots for a second resonator antenna from a second group of resonator antennas define a second geometric center, and the first geometric center and the second geometric center are at essentially the same position.

5. The borehole imaging tool of claim 1, wherein the plurality of resonator antennas are cavity resonators.

6. The borehole imaging tool of claim 5, further comprising one or more slots cut into each of the plurality of resonator antennas.

7. The borehole imaging tool of claim 6, wherein the one or more slots for a first resonator antenna from a first group of resonator antennas define a first geometric center, the one or more slots for a second resonator antenna from a second group of resonator antennas define a second geometric center, and the first geometric center and the second geometric center are at essentially the same position.

8. The borehole imaging tool of claim 1, wherein the resonance frequency is changed by adjusting a property of a resonator antenna.

9. The borehole imaging tool of claim 1, wherein the resonance frequency is changed by adjusting a dielectric constant of a resonator antenna.

10. The borehole imaging tool of claim 1, wherein the two or more groups of resonator antennas are disposed axially on the supporting structure such that at least one resonator antenna from each of the two or more groups of resonator antennas have the same azimuthal position.

11. The borehole imaging tool of claim 1, wherein the two or more groups of resonator antennas are disposed azimuthally on the supporting structure such that at least one resonator antenna from each of the two or more groups of resonator antennas have the same axial position.

12. The borehole imaging tool of claim 1, wherein the borehole imaging tool is a wireline tool.

13. The borehole imaging tool of claim 12, wherein the supporting structure is a pad.

14. The borehole imaging tool of claim 1, wherein the borehole imaging tool is a logging while drilling (LWD) tool.

15. The borehole imaging tool of claim 14, wherein the plurality of resonator antennas are disposed on one or more blades, and wherein the one or more blades are disposed on a bottom hole assembly of the logging while drilling tool.

16. The borehole imaging tool of claim 15, wherein the two or more groups of resonator antennas are disposed on the one or more blades.

17. The borehole imaging tool of claim 1, further comprising an information handling system communicatively connected to the borehole imaging tool and wherein the information handling system performs an inversion using the one or more downhole measurements to determine a mud property or a formation property.

18. The borehole imaging tool of claim 17, wherein the information handling system further plots the mud property or the formation property as an image.

19. The borehole imaging tool of claim 1, further comprising an information handling system communicatively connected to the borehole imaging tool and wherein the information handling system identifies a regression function by training a machine learning algorithm, and wherein the one or more downhole measurements are utilized as one or more inputs for the regression function to identify a mud property of a formation property as one or more outputs of the regression function.

20. The borehole imaging tool of claim 19, wherein the information handling system further identifies a plurality of regression functions and each of the plurality of regression functions has a different subset of the mud property or the formation property as the one or more outputs of the plurality of regression functions.

* * * * *